United States Patent
Benedetti et al.

(10) Patent No.: US 12,543,827 B2
(45) Date of Patent: Feb. 10, 2026

(54) PROCESS FOR PRODUCING AN ORNAMENTAL CHAIN

(71) Applicant: MINERVAHUB S.P.A., Milan (IT)

(72) Inventors: Samuele Benedetti, Milan (IT); Roberto Zuccherelli, Milan (IT)

(73) Assignee: MINERVAHUB S.P.A., Milan (IT)

( * ) Notice: Subject to any disclaimer, the term of this patent is extended or adjusted under 35 U.S.C. 154(b) by 137 days.

(21) Appl. No.: 18/457,032

(22) Filed: Aug. 28, 2023

(65) Prior Publication Data
US 2024/0065392 A1  Feb. 29, 2024

(30) Foreign Application Priority Data
Aug. 31, 2022 (IT) .......................... 102022000017856

(51) Int. Cl.
 *B21L 11/00* (2006.01)
 *A44C 11/00* (2006.01)

(52) U.S. Cl.
 CPC .............. *A44C 11/00* (2013.01); *B21L 11/005* (2013.01)

(58) Field of Classification Search
 CPC ........... Y10T 29/49588; Y10T 29/4959; Y10T 29/49591–49597; B21L 7/00; B21L 11/005
 See application file for complete search history.

(56) References Cited

U.S. PATENT DOCUMENTS

| | | | | |
|---|---|---|---|---|
| 978,847 A * | 12/1910 | Carlisle | ............... | B23K 20/233 428/590 |
| 1,465,553 A | 8/1923 | Kirk | | |
| 2,257,356 A * | 9/1941 | Wacker | ................ | B21L 11/005 59/20 |
| 4,114,398 A * | 9/1978 | Orlandini | ................ | B23P 15/00 228/159 |
| 4,986,067 A | 1/1991 | Caccialupi | | |
| 6,381,942 B1 * | 5/2002 | Grosz | ..................... | B21C 37/09 59/16 |
| 6,470,571 B1 | 10/2002 | Namiki | | |
| 6,993,841 B2 * | 2/2006 | Grotti | ................ | A44C 15/0025 63/4 |

FOREIGN PATENT DOCUMENTS

| | | |
|---|---|---|
| DE | 29906888 | 7/1999 |
| EP | 0627181 | 12/1994 |
| IT | 201900023166 | 6/2021 |

OTHER PUBLICATIONS

Italian Application Issued in Italian Application No. 202200017856; mailed Apr. 12, 2023.
Written Opinion Issued in Italian Application No. 202200017856; mailed Apr. 12, 2023.

* cited by examiner

*Primary Examiner* — Sarang Afzali
(74) *Attorney, Agent, or Firm* — Ferguson Case Orr Paterson

(57) ABSTRACT

A process for producing an ornamental chain includes arranging a cylindrical polymer core inside a tubular metal casing to form a layered tubular profile, cutting and bending the layered tubular profile to form a plurality of shaped chain links, and connecting the shaped chain links to form an ornamental chain. In some embodiments, the forming of the layered tubular profile can include extruding the cylindrical polymer core and inserting the cylindrical polymer core into a hollow section of the tubular metal casing.

15 Claims, 4 Drawing Sheets

PROCESS FOR PRODUCING AN ORNAMENTAL CHAIN

CROSS-REFERENCE TO RELATED APPLICATION

This application claims priority to Italian Patent Application No. 102022000017856 filed on Aug. 31, 2022, the contents of which are incorporated by reference herein in their entirety.

FIELD OF THE INVENTION

The present invention relates to a process for producing an ornamental chain, and to an ornamental chain.

BACKGROUND ART

Ornamental chains are widely used in the field of fashion, for example for decorating bags or garments and accessories.

In addition to having a merely aesthetic function, ornamental chains are often used for structural needs.

For example, for bags, ornamental chains can be used as a strap or used in the bag closing mechanism.

In clothing and accessories, ornamental chains can be used, for example, as a belt or finishing, or they can be an integral part of the structure of the garment itself.

Therefore, known ornamental chains are made of materials adapted to give them both aesthetic value and structural properties suitable to support the loads to which they are subjected when using the bag or the garment or accessory to which they are applied.

Ornamental chains made of metal materials, such as aluminum or alloys thereof, are known.

Despite aluminum being one of the lightest metal materials, known ornamental chains thus formed are however heavier than is desirable.

In fact, the need is felt to have ornamental chains having high aesthetic and functional properties, while having a low weight compared to known ornamental chains.

Solution

It is the object of the present invention to provide a process for producing an ornamental chain such as to avoid at least some of the drawbacks noticed in the prior art.

It is a particular object of the present invention to provide a process for producing an ornamental chain, and an ornamental chain, which have high aesthetic and functional properties, while having a low weight compared to known ornamental chains.

This and other objects are achieved by a process for producing an ornamental chain, and by an ornamental chain, according to the independent claims.

The dependent claims relate to preferred and advantageous embodiments of the present invention.

FIGURES

In order to better understand the invention and appreciate the advantages thereof, some non-limiting exemplary embodiments thereof will be described below with reference to the accompanying drawings, in which.

DESCRIPTION OF SOME PREFERRED EMBODIMENTS

Figure 6:
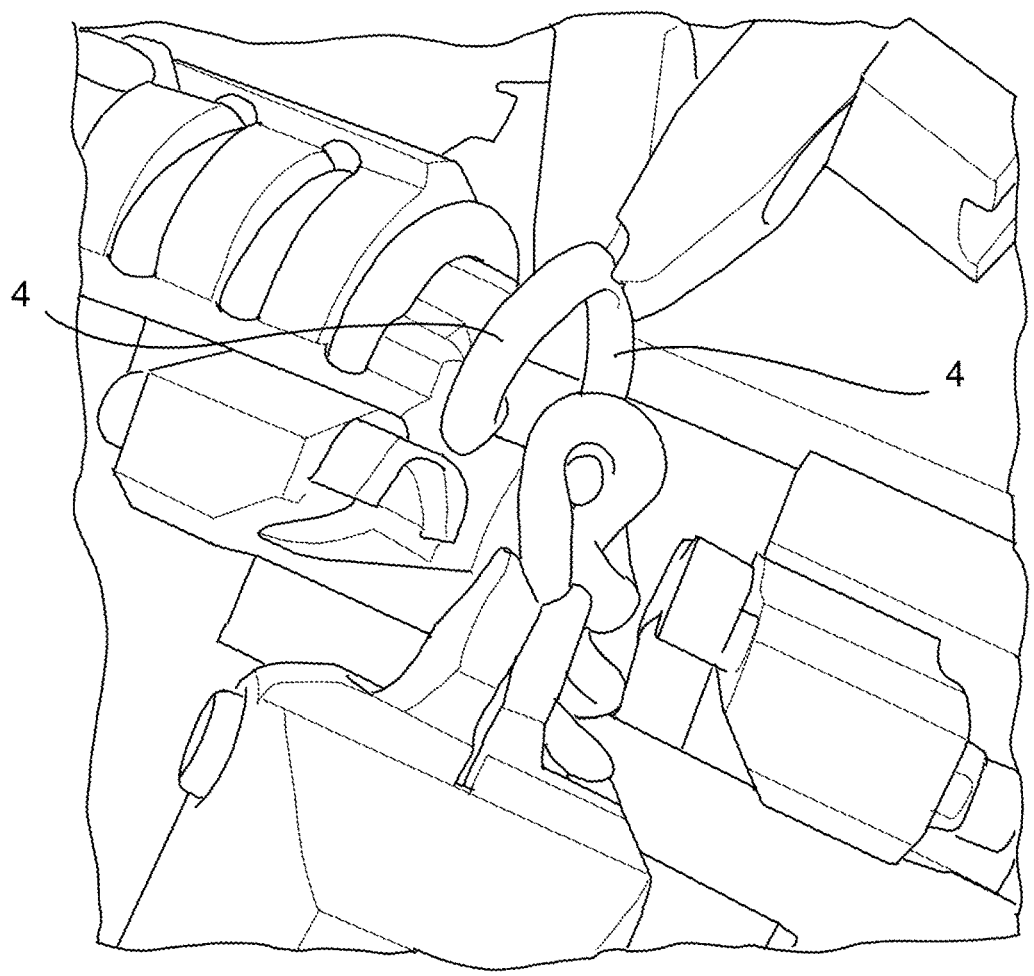
FIG. 6 shows a further step of making an ornamental chain, according to an embodiment of the invention.
Figure 8:
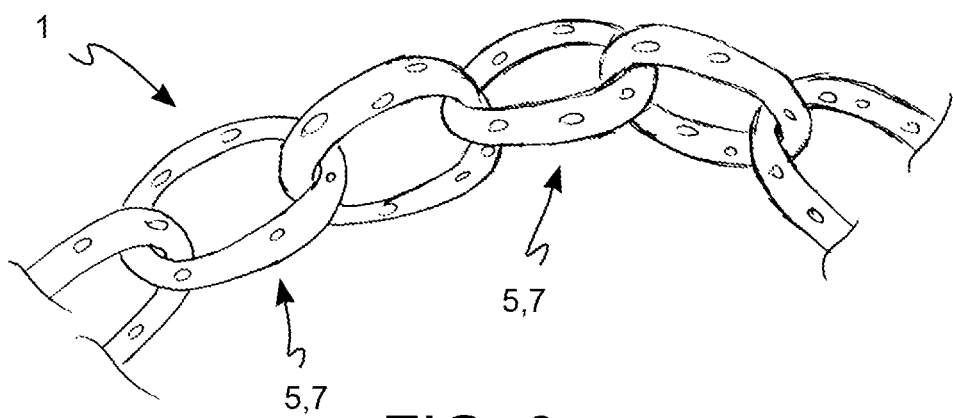
FIG. 8 is a perspective view of an ornamental chain, according to an embodiment of the invention.

With reference to the figures, a process for producing an ornamental chain 1 comprises the following manufacturing steps:
- arranging a tubular polymer core 2 inside a tubular metal casing 3 to form a layered tubular profile 4;
- cutting and bending the layered tubular profile 4 to form a plurality of shaped chain links 5 (FIG. 6);
- connecting the chain links 5 to form the ornamental chain 1 (FIG. 8).

Advantageously, a production process thus configured allows producing an ornamental chain 1 having high aesthetic and functional properties, while having a low weight compared to known ornamental chains.

In fact, by means of the core 2 made of polymer material enclosed by the casing 3 made of metal material, the ornamental chain 1 weighs up to 70% less than ornamental chains made of aluminum having the same volume.

Figure 1:
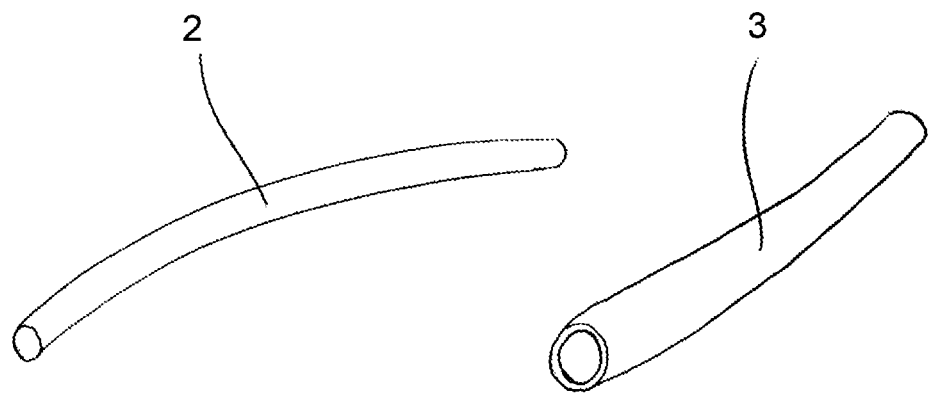
FIG. 1 is a perspective view of two components of an ornamental chain, according to an embodiment of the invention.
Figure 3:
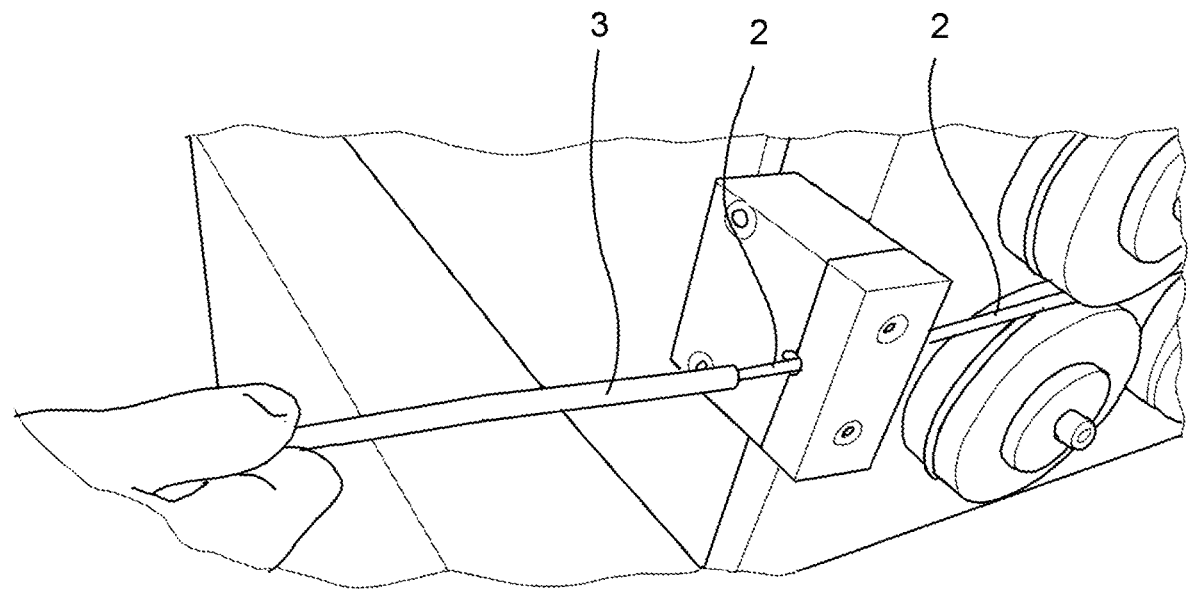
FIG. 3 shows a further step of making an ornamental chain, according to an embodiment of the invention.

According to an embodiment, the step of arranging a tubular polymer core 2 inside a tubular metal casing 3 to form a layered tubular profile 4 is carried out through the following steps:
- extruding a tubular polymer core 2 (FIG. 1);
- providing a tubular metal casing 3, where the tubular metal casing 3 has a hollow section (FIG. 1);
- inserting the tubular polymer core 2 into the tubular metal casing 3 to form a layered tubular profile 4 (FIG. 3).

According to an embodiment, the step of arranging a tubular polymer core 2 inside a tubular metal casing 3 to form a layered tubular profile 4 is carried out through the following steps:
- molding at least one portion of the tubular metal casing 3 having a hollow section;
- over-molding the tubular polymer core 2 inside the partially molded tubular metal casing 3;
- completing the molding of the tubular metal casing 3 around the tubular polymer core 2 to form a layered tubular profile 4.

Advantageously, according to this embodiment, the tubular polymer core 2 and the tubular metal casing 3 are co-molded one inside the other to form the layered tubular profile 4.

According to an embodiment, the step of extruding a tubular polymer core 2 comprises extruding a tubular polymer core 2 having a full section.

Advantageously, this configuration preserves the structural properties of the ornamental chain 1.

According to an embodiment, the tubular metal casing 3 is made of aluminum.

Figure 2:
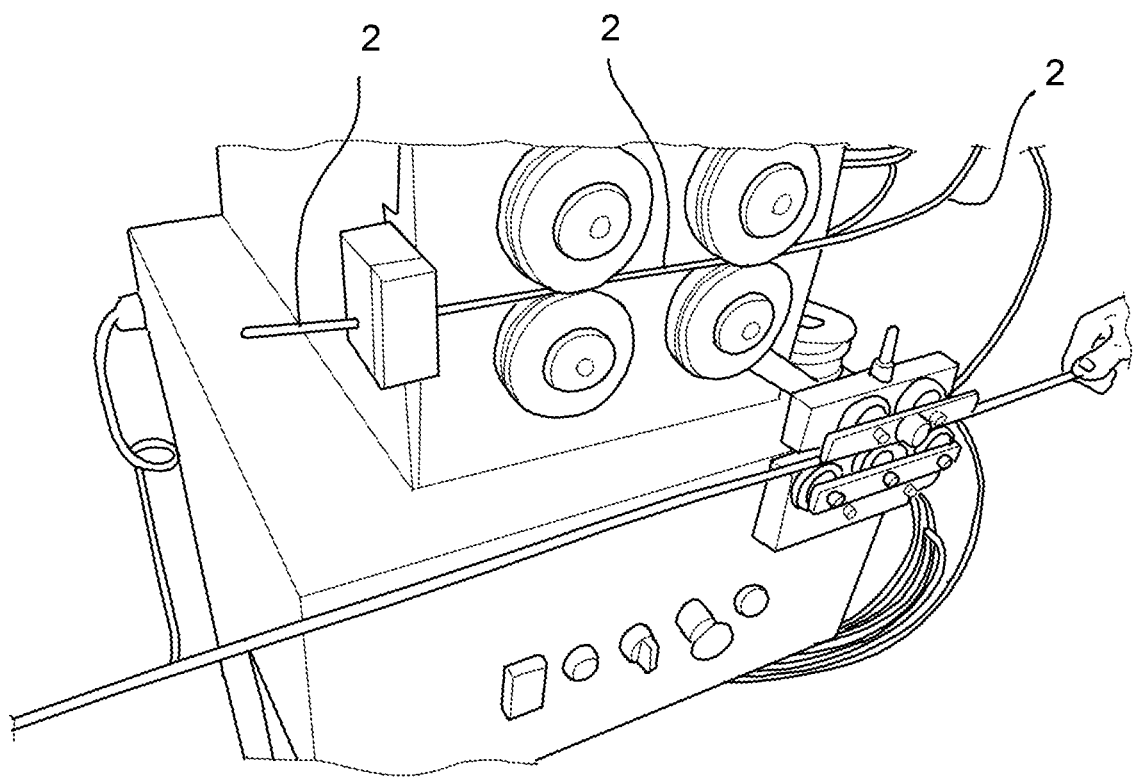
FIG. 2 shows a step of making an ornamental chain, according to an embodiment of the invention.

According to an embodiment, the production process comprises a step of straightening the tubular polymer core 2 (FIG. 2).

The straightening step is performed following the step of extruding a tubular polymer core 2.

Moreover, the straightening step is performed before the step of inserting the tubular polymer core 2 into the tubular metal casing 3, to form a layered tubular element 4.

Advantageously, by means of the straightening step it is possible to straighten, linearly extend, the tubular polymer core 2 exiting from the extruder, and correct any linearity defects.

Figure 4:
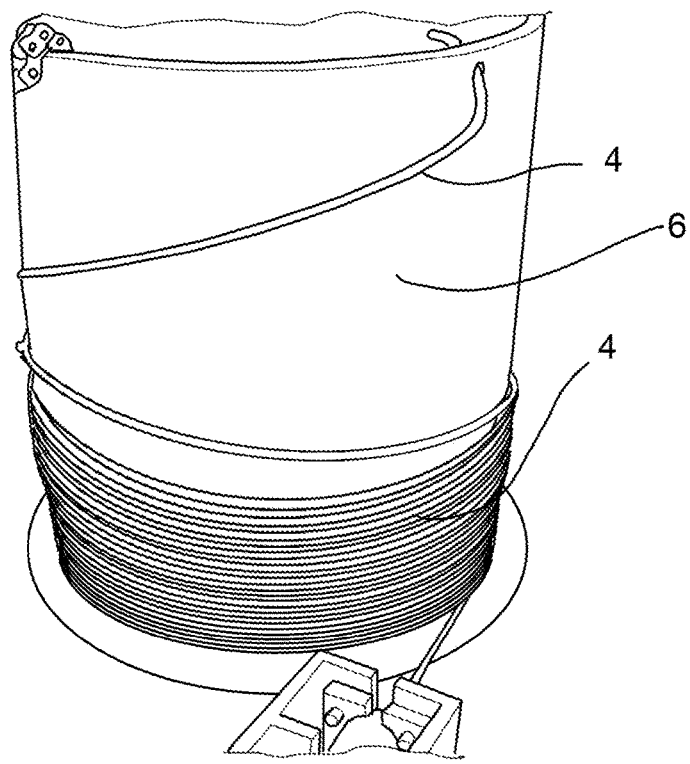
FIG. 4 shows a further step of making an ornamental chain, according to an embodiment of the invention.

According to an embodiment, the production process comprises a step of drawing the layered tubular profile 4 (FIG. 4).

The step of drawing the layered tubular profile 4 aims to reduce or eliminate the clearance between the tubular polymer core 2 and the tubular metal casing 3 of the layered tubular profile 4.

Such a clearance between the tubular polymer core 2 and the tubular metal casing 3, being reduceable or eliminable following the drawing step, is necessary to perform the previous step of inserting the tubular polymer core 2 into the tubular metal casing 3 to form a layered tubular profile 4.

According to an embodiment, the step of drawing the layered tubular profile 4 is performed following the step of arranging a tubular polymer core 2 inside a tubular metal casing 3 to form a layered tubular profile 4. Preferably, the step of drawing the layered tubular profile 4 is performed following the step of inserting the tubular polymer core 2 into the tubular metal casing 3 to form a layered tubular profile 4.

Moreover, the step of drawing the tubular layered profile 4 is performed before the step of cutting and bending the layered tubular profile 4 to form a plurality of shaped chain links 5.

According to an embodiment, the step of drawing the tubular layered profile 4 causes the layered tubular profile 4 to narrow.

The narrowing of the layered tubular profile 4 results in a reduction or elimination of the clearance previously present between the tubular polymer core 2 and the tubular metal casing 3 forming the layered tubular profile 4.

According to an embodiment, the step of drawing the layered tubular profile 4 is performed by fixing an end of the layered tubular profile 6 to a winding cylinder 4 and keeping an opposite end of the layered tubular profile 4 under tension.

During the drawing step, the layered tubular profile 4 is thus subjected to tensile stress.

The winding cylinder 6 is then rotated in order to wind the layered tubular profile 4 onto the winding cylinder 6, thus subjecting the layered tubular profile 4 to tensile stress.

The winding of the layered tubular profile 4 subjected to tensile stress on the winding cylinder 6 causes the layered tubular profile 4 to narrow.

Therefore, a reduction or elimination of the clearance previously present between the tubular polymer core 2 and the tubular metal casing 3 forming the layered tubular profile 4 occurs.

Figure 5:
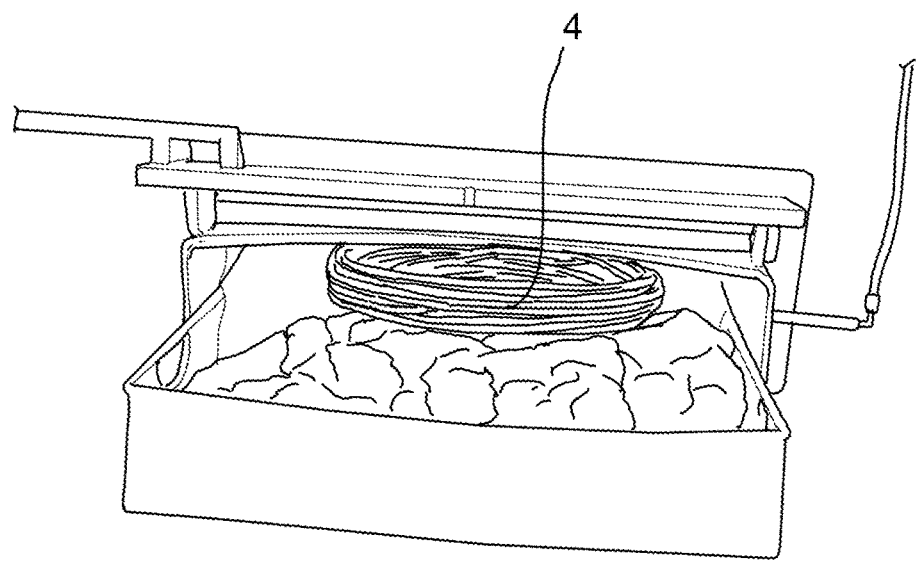
FIG. 5 shows a further step of making an ornamental chain, according to an embodiment of the invention.

According to an embodiment, the production process comprises a step of firing the layered tubular profile 4 (FIG. 5).

Advantageously, the step of firing the tubular layered profile 4 facilitates the subsequent step of cutting and bending the layered tubular profile 4 to form a plurality of shaped chain links 5.

According to an embodiment, the step of firing the tubular layered profile 4 is performed before the step of cutting and bending the layered tubular profile 4 to form a plurality of shaped chain links 5.

Moreover, the step of firing the layered tubular profile 4 is performed following the step of arranging a tubular polymer core 2 inside a tubular metal casing 3 to form a layered tubular profile 4. Preferably, the step of firing the layered tubular profile 4 is performed following the step of inserting the tubular polymer core 2 into the tubular metal casing 3 to form a layered tubular profile 4.

According to an embodiment, the step of firing the layered tubular profile 4 is performed following the step of drawing the layered tubular profile 4.

According to an embodiment, the production process comprises a step of tumbling and polishing the chain links 5 or the ornamental chain 1.

The mechanical "tumbling" process is otherwise referred to as "barreling".

According to an embodiment, the tumbling and polishing step is performed following the step of cutting and bending the layered tubular profile 4 to form a plurality of shaped chain links 5.

According to an embodiment, the step of tumbling and polishing the chain links 5 is performed before the step of connecting the chain links 5 to form the ornamental chain 1.

According to an alternative embodiment, the step of tumbling and polishing the ornamental chain 1 is performed following the step of connecting the chain links 5 to form the ornamental chain 1.

Figure 7:
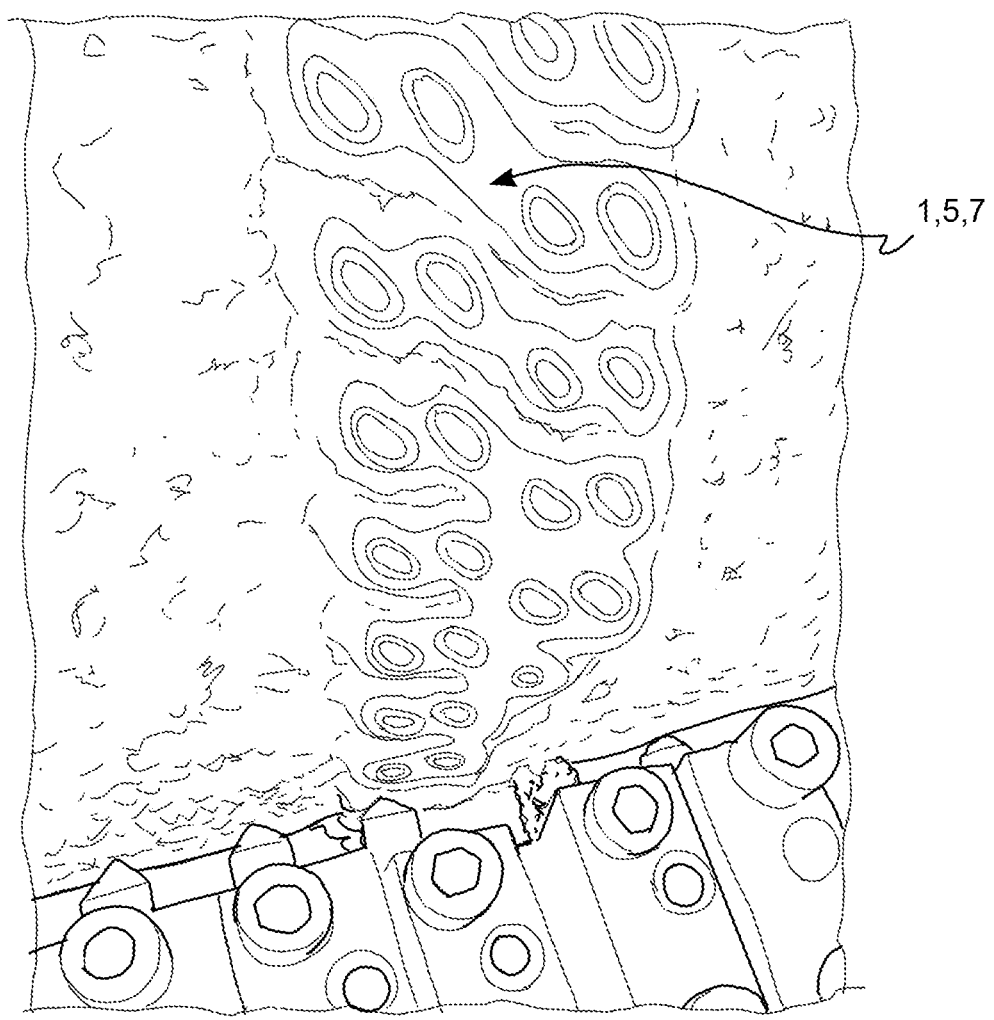
FIG. 7 shows a further step of making an ornamental chain, according to an embodiment of the invention.

Advantageously, the step of tumbling and polishing the chain links 5 of the ornamental chain 1 aims at superficially finishing the chain links 5 of the ornamental chain 1, and thus increasing the aesthetic value thereof. According to an embodiment, the production process comprises a step of diamond grinding the chain links 5 or the ornamental chain 1 (FIG. 7).

Diamond ground chain links 7 are thus obtained.

Advantageously, the diamond grinding step aims to engrave the tubular metal casing 3 of the chain links 5 to make the tubular polymer core 2 of the chain links 5 of the ornamental chain 1 emerge.

The diamond grinding thus increases the aesthetic value of the ornamental chain 1.

According to an embodiment, the diamond grinding step is performed following the step of cutting and bending the layered tubular profile 4 to form a plurality of shaped chain links 5.

According to an embodiment, the diamond grinding step is performed following the tumbling and polishing step.

According to an embodiment, the diamond grinding step is performed following the step of connecting the chain links 5 to form the ornamental chain 1.

According to an alternative embodiment, the diamond grinding step is performed before the step of connecting the chain links 5 to form the ornamental chain 1.

Following the diamond grinding step, an ornamental chain 1 consisting of diamond ground chain links 7 connected to one another can thus be made.

According to an embodiment, the step of arranging a tubular polymer core 2 inside a tubular metal casing 3 to form a layered tubular profile 4, or the step of extruding a tubular polymer core 2 and the step of providing a tubular metal casing 3 are performed so that the ratio of the diameter of the tubular polymer core 2 to the diameter of the tubular metal casing 3 is substantially between 1.00:2.00 and 1.99:2.00.

Alternatively, the ratio of the diameter of the tubular polymer core 2 to the diameter of the tubular metal casing 3 is substantially between 1.50:2.00 and 1.95:2.00.

Alternatively, the ratio of the diameter of the tubular polymer core 2 to the diameter the tubular metal casing 3 is substantially between 1.75:2.00 and 1.90:2.00.

According to an embodiment, the step of drawing the layered tubular profile 4 is performed so that, at the end of the drawing step, the ratio of the diameter of the tubular polymer core 2 to the diameter of the tubular metal casing 3 is substantially between 1.00:2.00 and 1.99:2.00.

Alternatively, at the end of the drawing step, the ratio of the diameter of the tubular polymer core 2 to the diameter of the tubular metal casing 3 is substantially between 1.50:2.00 and 1.95:2.00.

Alternatively, at the end of the drawing step, the ratio of the diameter of the tubular polymer core 2 to the diameter of the tubular metal casing 3 is substantially between 1.75:2.00 and 1.90:2.00.

According to a further aspect of the invention, an ornamental chain 1 comprises a plurality of chain links 5 or diamond ground chain links 7 connected to one another.

At least one, preferably each, of the chain links 5 or diamond ground chain links 7 of the ornamental chain 1 comprises a tubular polymer core 2 positioned inside a tubular metal casing 3.

According to a further aspect of the invention, an ornamental chain 1 is made according to the production process previously described.

Obviously, those skilled in the art will be able to make changes or adaptations to the present invention, without however departing from the scope of the following claims.

LIST OF REFERENCE NUMERALS

1. Ornamental chain
2. Tubular polymer core
3. Tubular metal casing
4. Layered tubular profile
5. Chain link
6. Winding cylinder
7. Diamond ground chain link

The invention claimed is:

1. A process for producing an ornamental chain, the process comprising:
    arranging a cylindrical polymer core inside a hollow section of a tubular metal casing to form a layered tubular profile, wherein the cylindrical polymer core has a full section;
    forming a plurality of shaped chain links by
        cutting the layered tubular profile into cut pieces and then
        bending the cut pieces to form the shaped chain links; and
    connecting the shaped chain links to form the ornamental chain.

2. The process of claim 1, wherein arranging the cylindrical polymer core inside the hollow section of the tubular metal casing to form the layered tubular profile comprises:
    extruding the cylindrical polymer core;
    providing the tubular metal casing; and
    inserting the cylindrical polymer core into the tubular metal casing to form the layered tubular profile.

3. The process of claim 2, further comprising:
    straightening the cylindrical polymer core, wherein said straightening is performed following extruding the cylindrical polymer core, and before inserting the cylindrical polymer core into the tubular metal casing to form the layered tubular profile.

4. The process of claim 1, wherein arranging the cylindrical polymer core inside the tubular metal casing to form the layered tubular comprises:
    partially molding at least one portion of the tubular metal casing having the hollow section;
    over-molding the cylindrical polymer core inside the partially molded tubular metal casing; and
    completing the molding of the tubular metal casing around the over-molded cylindrical polymer core to form the layered tubular profile.

5. The process of claim 1, further comprising:
    drawing the layered tubular profile to reduce or eliminate a clearance between the cylindrical polymer core and the tubular metal casing of the layered tubular profile, wherein drawing the layered tubular profile is performed following arranging the cylindrical polymer core inside the tubular metal casing to form the layered tubular profile, and before forming the plurality of shaped chain links.

6. The process of claim 5, wherein drawing the layered tubular profile is performed by fixing an end of the layered tubular profile to a winding cylinder and keeping an opposite end of the layered tubular profile under tension, so that during the drawing the layered tubular profile is subjected to tensile stress,
    and wherein the winding cylinder is then rotated in order to wind the layered tubular profile onto the winding cylinder, subjecting the layered tubular profile to tensile stress, so that the winding of the layered tubular profile subjected to tensile stress on the winding cylinder causes a narrowing of the layered tubular profile.

7. The process of claim 5, wherein firing the layered tubular profile is carried out following drawing the layered tubular profile.

8. The process of claim 5, wherein drawing the layered tubular profile is performed so that, at an end of drawing, a ratio of the diameter of the cylindrical polymer core to a diameter of the tubular metal casing is between 1.00:2.00 and 1.99:2.00.

9. The process of claim 1, further comprising:
    firing the layered tubular profile,
    wherein firing the layered tubular profile is performed before forming the plurality of shaped chain links, and following arranging the cylindrical polymer core inside the tubular metal casing to form the layered tubular profile.

10. The process of claim 9, further comprising drawing the layered tubular profile prior to firing the layered tubular profile.

11. The process of claim 1, further comprising:
    tumbling and polishing the shaped chain links or the ornamental chain,
    wherein tumbling and polishing the shaped chain links or ornamental chain is performed following forming the plurality of shaped chain links, and wherein tumbling and polishing is performed:
        before connecting the shaped chain links to form the ornamental chain if tumbling and polishing the shaped chain links, or
        following connecting the shaped chain links to form the ornamental chain if tumbling and polishing the ornamental chain.

12. The process of claim 11, further comprising diamond grinding the shaped chain links or the ornamental chain following tumbling and polishing.

13. The process of claim 1, further comprising:
diamond grinding the shaped chain links or the ornamental chain,
wherein the diamond grinding is performed following forming the plurality of shaped chain links, and wherein the diamond grinding is performed:
   following connecting the shaped chain links to form the ornamental chain if diamond grinding the ornamental chain, or
   is performed before connecting the shaped chain links to form the ornamental chain if diamond grinding the shaped chain links.

14. The process of claim 13, further comprising tumbling and polishing the shaped chain links or the ornamental chain prior to diamond grinding.

15. The process of claim 1, wherein arranging the cylindrical polymer core inside the tubular metal casing to form the layered tubular profile, or extruding the cylindrical polymer core and providing the tubular metal casing are performed so that a ratio of a diameter of the cylindrical polymer core to a diameter of the tubular metal casing is between 1.00:2.00 and 1.99:2.00.

* * * * *